Feb. 21, 1933.   W. DUBILIER   1,898,174
FLASHER DEVICE
Filed Sept. 11, 1926   7 Sheets-Sheet 1

Inventor.
William Dubilier
By John B Brady
Attorney.

Feb. 21, 1933.  W. DUBILIER  1,898,174
FLASHER DEVICE
Filed Sept. 11, 1926    7 Sheets-Sheet 2

Inventor
William Dubilier
By John P. Brady
Attorney.

Feb. 21, 1933.                W. DUBILIER                1,898,174
                              FLASHER DEVICE
                          Filed Sept. 11, 1926          7 Sheets-Sheet 4

Inventor.
William Dubilier
By John B. Brady
Attorney.

Feb. 21, 1933.   W. DUBILIER   1,898,174
FLASHER DEVICE
Filed Sept. 11, 1926   7 Sheets-Sheet 5

Inventor
William Dubilier
By John B. Brady
Attorney.

Feb. 21, 1933.　　　　W. DUBILIER　　　　1,898,174
FLASHER DEVICE
Filed Sept. 11, 1926　　　7 Sheets-Sheet 6

INVENTOR
William Dubilier
BY
John B. Brady
ATTORNEY

Patented Feb. 21, 1933

1,898,174

UNITED STATES PATENT OFFICE

WILLIAM DUBILIER, OF NEW ROCHELLE, NEW YORK

FLASHER DEVICE

Application filed September 11, 1926. Serial No. 134,926.

This invention relates to improvements in controlling apparatus; especially controlling apparatus for electric appliances designed for intermittent operation or flashing.

An object of the invention is to provide a circuit controlling apparatus or device which will energize a signal, for example a lamp, that is to be caused to flash with desired time intervals and which is easy and cheap to produce, and certain in its action.

The nature of the invention is set forth in the following description and accompanying drawings, that show several forms in which my invention is embodied, but the disclosure is illustrative only, and I may make changes in detail without departing from the principle of the invention, or exceeding the scope and meaning of the terms of the appended claims.

On the drawings.

Figure 3 is a bottom and Figure 4 a top view of said modification;

Figure 5 shows an arrangement of circuits for one use of these devices;

Figure 9 is a top view; Figure 10 a bottom view.

Figure 18 is a bottom plan and Figure 19 a cross section of one of the terminal caps for this modification;

Figure 20 is a cross section of an additional form of lamp-socket device to produce flashing of an ordinary lamp therein;

Figure 21 is a developed view of a part of the device shown in Figure 20;

Figure 22 is a top view.

Figure 24 is a top view of a modification of the device shown in Figures 22 and 23;

Figures 26, 27, 28, 29, and 30 are cross sectional views of different forms of controlling devices with means for opening and closing a circuit differing in character from the corresponding means shown in the preceding views; Figures 30 and 29 presenting constructions to give a longer interval between flashes when a lamp is operated;

The same numerals identify the same parts throughout.

Figure 1:
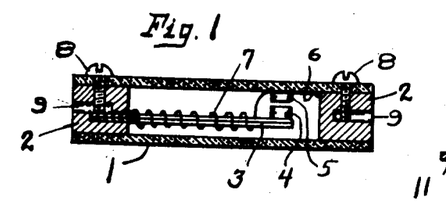
Figure 1 is a longitudinal section of one device according to my invention.

Figure 1 shows a simple flasher device that includes a casing of insulation 1, this casing being in the form of a sleeve or tube, with closures 2, preferably of metal or other electrically conductive material, at the ends. Within the casing, secured to one of the ends, for example, is a thermally responsive member 3, bearing at its outer end a contact 4. This member is made of two strips of metal of different coefficients of expansion, so that heating the member will cause it to bend to one side and cooling to the opposite side. When a rise in temperature takes place, the member 3 will move to carry the contact 4 thereon into engagement with a fixed contact 5 affixed to the inside of the casing 1, and this contact 5 is connected by a conductor strip 6 to one of the ends or closures 2. Around the member 3 is wrapped a coil of heater wire 7, united to the closure 2 bearing the member 3, and to contact 5. To hold the ends 2 in place I may employ screws 8 which pass through openings in the casing, and into threaded holes in the closures 2. These screws may have their inner ends entering bores 9 in the closures 2, and these bores may receive the ends of wires or conductors, to be held fast by the screws and connect the device into an electrical circuit.

In practice, the contacts 4 and 5 will be normally separated, but current flowing through the heater element or wire 7 will cause the member 3 to grow warm and to bend and carry the contact 4 thereon into engagement with the contact 5. The wire 7 is then short-circuited, and the member 3 cools off and permits the two contacts to separate. Then current again flows through the coil 7, and the circuit closes as before. Thus the circuit is opened and closed repeatedly, and if a lamp is in the circuit it will give successive flashes. This form of flasher device is very simple, costs little, and operates perfectly for very long periods without getting out of order.

Figure 2:
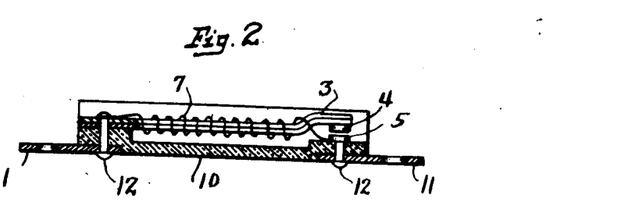
Figure 2 is a similar view of a modification.
Figures 3, 4, 5:
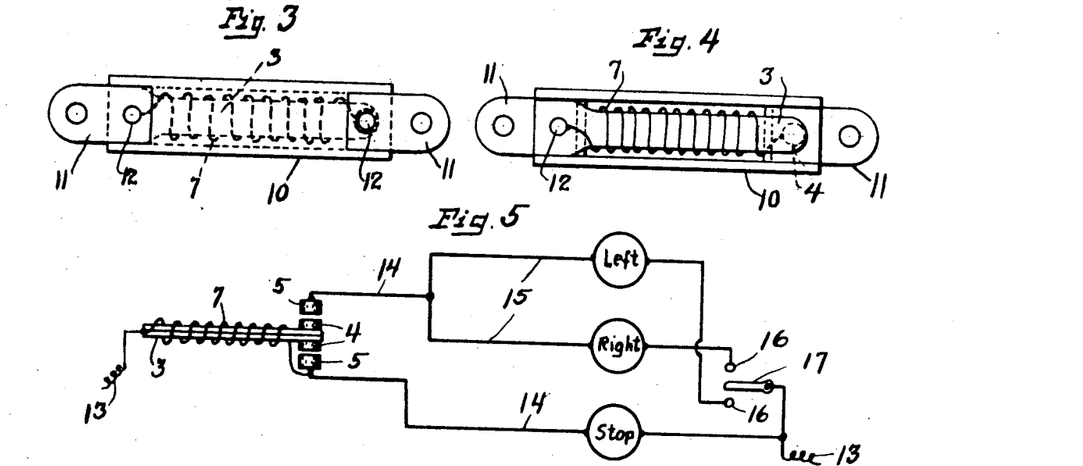

Figures 2, 3, and 4 present another form comprising a trough-shaped body or support, preferably of insulation, with lugs 11 secured to the bottom at each end. These lugs are for mounting and for enabling conductors to be connected thereto, and are perforated for this purpose. They are secured to the body 10 by rivets 12, one of which also affixes to the body 10 the thermally responsive member 3 bearing the contact 4, and the other carries at the end within the trough the fixed contact 5. The heater wire 7 encircles the member 3 and runs from one rivet to the other. The member 3 is disposed in the trough between the sides thereof; and the operation is the same as above set forth.

In Figure 5 is a diagram of circuits of automobile signals to be controlled by my invention. Here a thermally responsive member 3 has two contacts 4, one on each face; and each co-operates with a fixed contact 5, the fixed contacts being on opposite sides of the member 3. The wire 7 is coiled around the member 3 and connected at one end to a circuit conductor 13, and at its other to the lower fixed contact 5. This contact 5 is united by a conductor 14 to one terminal of a stop signal of the flashlight type, the remaining terminal of which is also joined to the circuit through another conductor 13. Whenever this circuit is closed the signal will flash intermittently. Similarly, a conductor 14 unites the other fixed contact 5 to a branched circuit comprising wires 15 leading to switch terminals 16. In the line of each wire or conductor 15 is a flashlight signal, and to the conductor 13 adjacent the stop signal is connected a pivoted switch arm 17. This arm can be moved to connect in either signal in the line of the two conductors 15. Hence, if one of these signals illuminates a left turn indicator, and the other a right turn indicator, such a signal will flash with the stop signal. If this circuit is installed on an automobile, the turning of this switch to engage one of the contacts 16 will announce the direction in which the driver intends to turn with the car, while first energizing the flashlight stop signal in the line of the conductor 14.

Figure 6:
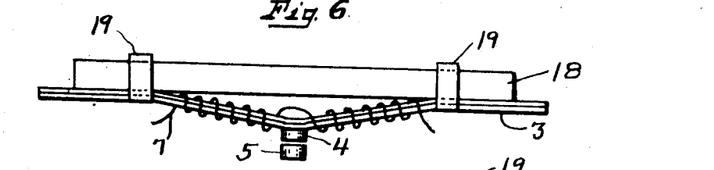
Figure 6 is a side view, and Figure 7 a perspective view of a part, of another form of controlling device according to my invention.
Figure 7:
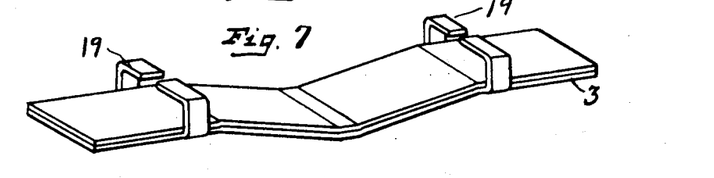

Figures 6 and 7 show an insulating support 18 with a thermostatic member 3, secured to the support adjacent its ends, and bent to be spaced from the support at its middle. This member is affixed to the bridge 18 by lateral projections 19 bent over the sides of the support 18. The contact 4 on the member 3 touches the fixed contact 5 on the member 3 being heated, and the coil 7 encircles the member between the projections 19.

Figure 8:
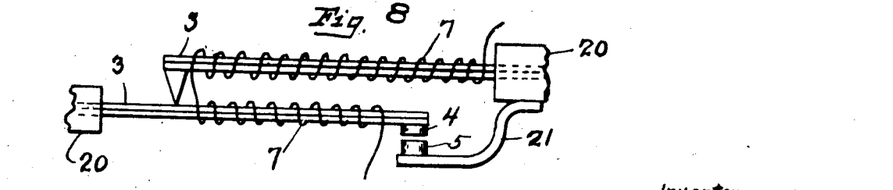
Figure 8 shows another arrangement to secure relatively quick action of interrupting and closing the circuit.

In Figure 8 the member 3 is attached to a fixed support 20 to be joined to one end of the circuit, and the contact 4 thereon co-operates with a contact 5 on an arm 21, rigid with a similar support 20, also to be connected in the circuit. To the second support 20 is affixed a second member 3, the end of which bears upon the first member; and a heater coil 7 encircles both members 3. On the members 3 becoming heated, the member 3 with the contact 4 moves to bring the contacts 4 and 5 together, and the other member 3 reinforces and accelerates the circuit-closing of the first. By this construction, a relatively quick opening and closing of the circuit are produced.

Figure 9:
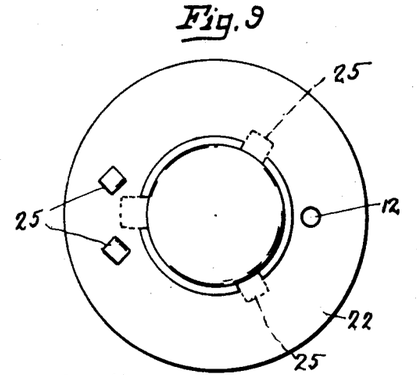
Figure 10:
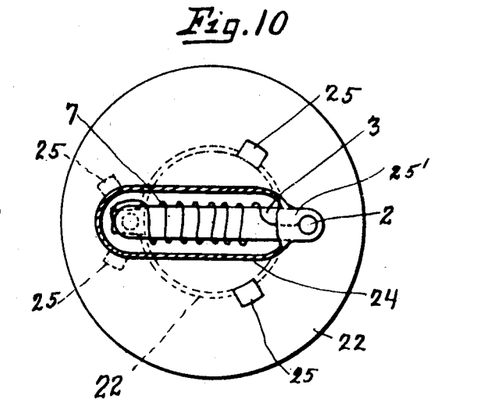
Figure 11:
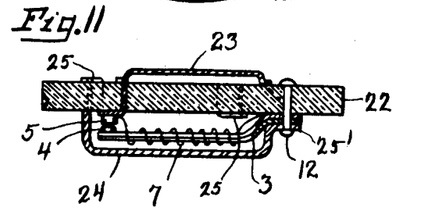
Figure 11 a cross section, of a controlling device according to my invention designed for placing in a standard electric lamp socket, to cause flashing of the lamp mounted therein.

Figures 9, 10 and 11 illustrate a flasher which can be put into an ordinary lamp socket in a lighting or other circuit. It comprises a body of insulation or disk 22, with a cap or cover 22 on one face and a cap or cover 24 on the other. These caps have projections 25 passing through openings in the disk, and with their ends bent over to hold the caps and the disk together. One of the projections 25 of the disk 23 carries the fixed contact 5, and under an out-turned projection 25' of the other cover and held by a rivet 12, is the end of the member 3, which lies under and is housed by the cap 24. Heater coil 7 extends from the fixed contact 5 to the rivet 12. This device has such size and shape that it can be put into the lamp socket of an ordinary commercial lighting circuit. One terminal of the lamp will engage one of the caps, which are the terminals of the device, and the other cap will engage the central terminal in the socket. The threaded neck of the lamp will screw into the threaded shell of the socket and thus the other end of the filament of the lamp will be in circuit. This device will operate like the preceding ones to make the lamp flash instead of producing a steady glow.

Figure 12:
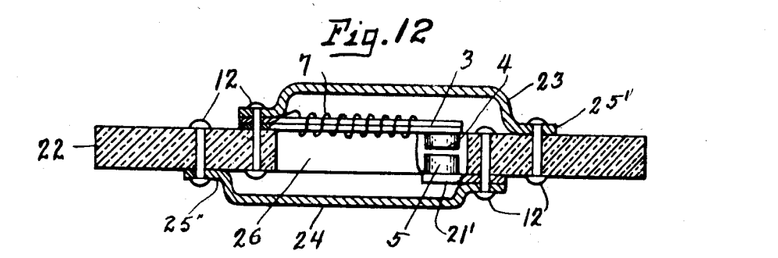
Figure 12 and Figure 13 are cross sections of other modifications, suitable for use in the same way.

In Figure 12, I show a flasher device to be put into a lamp socket, with the caps 23 and 24 provided with flanges or outward bent rims 25″, and held on the disk 22 by rivets 12 passing through the rims. One of the rivets makes fast the end of the member 3; and the fixed contact 5 is attached to an arm 21′ held fast by one of the other rivets 12. This device also closes the circuit on a rise in temperature. The two contacts project into an opening 26, which is closed by the two caps 23 and 24.

Figure 13:
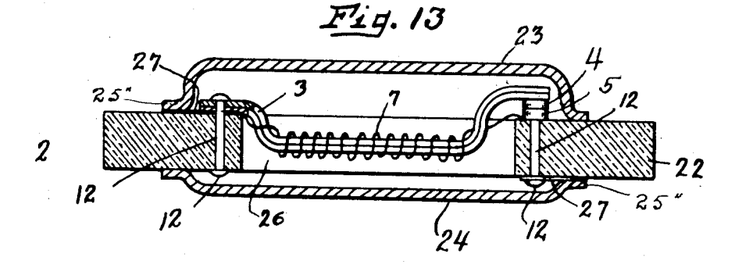

Figure 13 also shows a flasher device to be put into a standard lamp socket to make the lamp flash. In this construction a rivet 12 secures the fixed contact 5 to one face of the body 22, and the member 3 is bent between its fixed end, held fast by a rivet 12, and the end carrying the movable contact 4, so that the greater part of the length of the member 3 lies within the opening 26. The two rivets mentioned are joined one to each cap by a conductive strip 27. The caps are held on the disk as in either Figure 9 or Figure 12.

Figures 14 to 19 inclusive illustrate a socket flasher with the caps covered by insulation, and terminals on the outside of this insulation. The caps of metal for the two faces of the insulating disk 22 are shown at 28. They have projections 29 on the rims to engage apertures 30 in the disk 22; and over each cap is an insulating cover 31. Upon these insulating covers are metallic disks 32. Each cap has a cut-out tongue 33, bent at right angles to the cap, leaving an opening 34. The tongue of each cap passes through the opening 26 of the support 22, the opening 34 of the other cap, and slots in the outside linings 31 and metal disks 32 on these linings, and has its end bent down against the adjacent plate or disk 32 to secure this plate and the lining 31 in position. The opening 26 will have offset recesses 35 in its two sides to receive the tongues 33, so that the tongues will not make contact or interfere with the member 3 in this recess. A rivet 12 secures one end of the member 3 to one cap inside the device, and the contact 5 is riveted to the other cap. The hole for this rivet is shown at 36 (Figure 18) and at the sides of the opening 34 in each cap are notches 37, giving clearance to the opposite edges of the tongue 33 of the other cap extending through this opening. The outer downturned ends of the tongues 33 of the caps are the terminals of this device; and the heater wire between the rivet 12 and contact 5 will make the circuit close on heating and open on cooling as before.

Figures 18, 19, 20, 21:
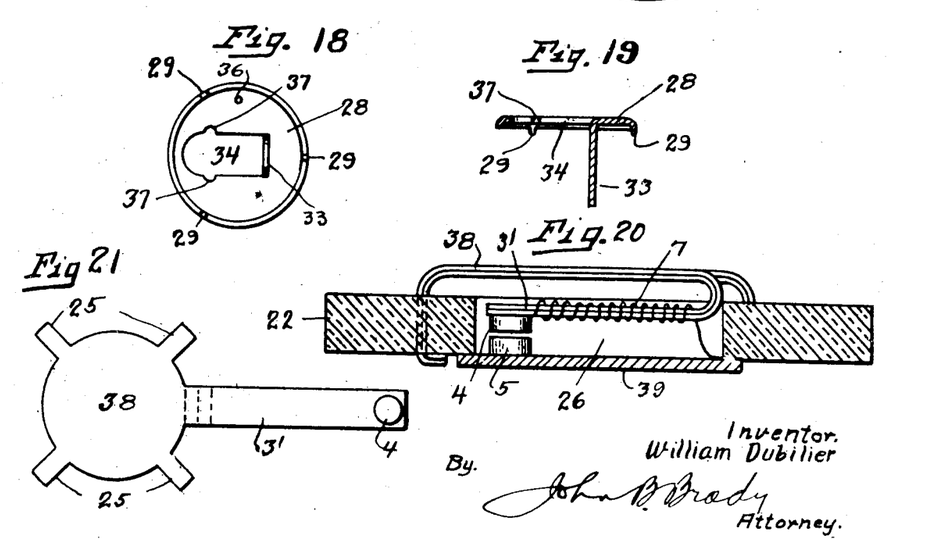

In Figures 20 and 21, only one cap 38 is used, but this cap comprises two layers of different co-efficients of expansion. It has an extension 3′, providing the bimetallic thermally responsive member bearing movable contact 4. This extension 3′ is bent to lie within the opening 26 of the disk 22. The cap 38 covers one end of this opening, and on the opposite face of the disk 22 is a metal plate closing the other end of the opening 26. Projections or points 25 passing through slots in the disk 22 hold the cap 38 on, and any suitable means may be utilized to secure the plate 39. On this plate is the fixed contact 5. The heater coil 7 again bridges the contacts to make them close on heating.

Figures 22 to 25 inclusive show a flasher device for a socket having two contact studs, with a lamp having two contacts in the end of the base or neck, instead of a lamp with a threaded neck of metal to provide one contact, and another contact at the center in the usual way. The support or disk 22 has a central opening 26; and the member 3 is mounted in this opening by bending one end and forcing it into a recess in the side of this opening. At one side the disk has a hole lined with a metal eyelet rivet 41 open at both ends; and at the opposite side it has a similar hole filled with a metal thimble closed at one end, and indicated by the numeral 42. The closed end of the thimble projects on one face of the disk; and over this end is a cap of metal 43, held on the disk in any suitable fashion, a piece of insulation 44 lying between the thimble and the cap 43. The fixed contact 5 is joined by a wire 46 to the cap 43, while the end of the member 3 is united by a wire 45 to the thimble 42. A heater coil of resistance wire 7 envelops the member 3, between the wire 46 and the contact 5.

Suppose the device is inserted into a lamp socket 47 (Figure 25) with two contact prongs 48 joined to the conductors of a lighting circuit. One of these studs will pass through the rivet 41 and the other will enter the thimble 42 and make contact therewith. A lamp 49 with a glow filament 50 is thrust into the socket 48. This lamp will have a metal neck 51 with two contact studs 52 in the end thereof. One of these studs will engage the stud 48 passing through the eyelet 41 and the other will abut the cover 43. Thus the circuit will be closed direct to one end of the filament 50, but to the other end it will be closed only through the member 3 and contacts 4 and 5 in the opening 26. Thus the lamp will flash as desired.

Figures 22, 24:
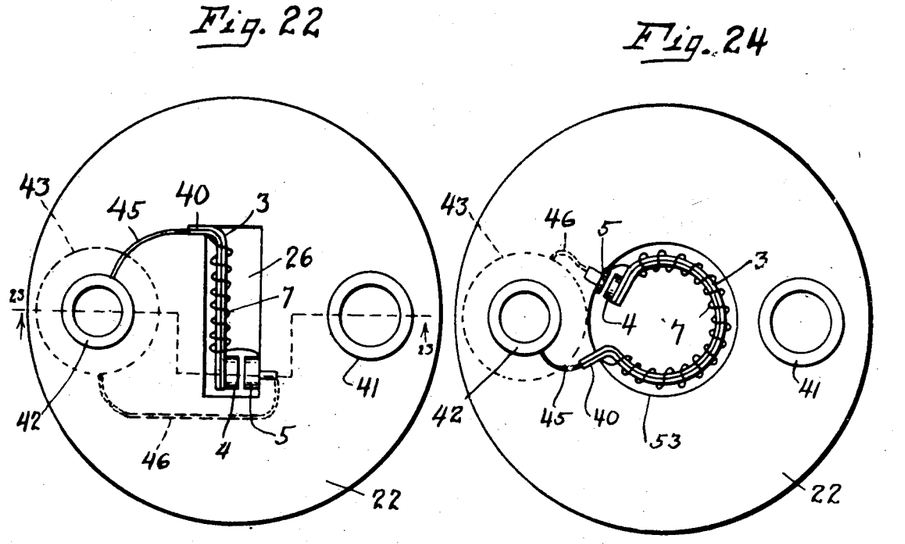
Figure 23:
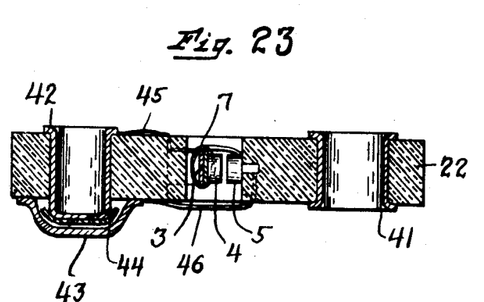
Figure 23 a cross section of a device for use in a socket with prong connections for flashing a lamp therein.
Figure 25:
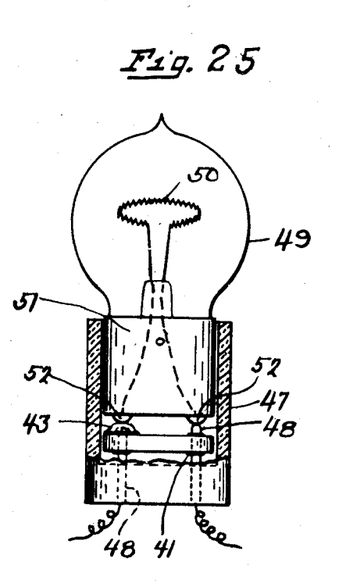
Figure 25 shows how such a device is inserted in the socket for flashing the lamp therein.

In Figure 24, the construction and operation are the same except that the opening 53 in the disk 22 is round, and the member 3 is correspondingly bent to be located therein.

Figure 26:
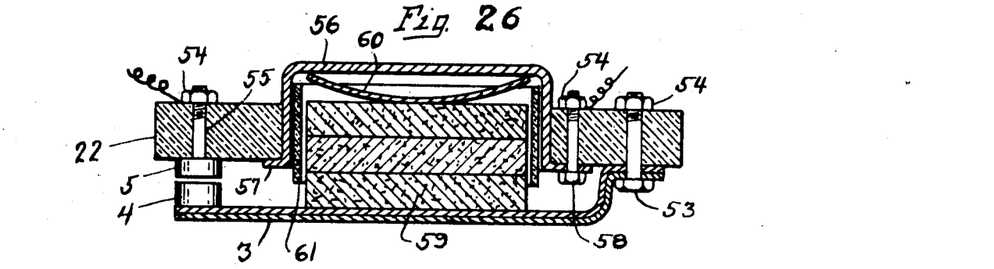

Figures 26 to 29 show carbon blocks substituted for the coil 7. In Figure 26 the member 3 is affixed to one face of the disk 22 by a bolt 53 and nut 54; and the fixed contact 5 has a threaded stem 55 which is engaged by a similar nut to hold this contact in place. In a central opening of the disk is placed a metal cap 56, the bottom of which projects beyond the opposite face of the disk 22, and the rim 57 of which engages the first face of the disk 22 and is made fast by one or more bolts 58 with nuts 54. In the cap is a resistor of carbon blocks 59 pressed against the member 3 by a resilient element 60 between the blocks and the inner end of the cap. Around the blocks is an insulating sleeve 61. One terminal of the circuit is joined to the cap and the other to the contact 5. This device may operate in such a manner that the member 3 normally holds the contacts 4 and 5 together, but separates the contacts when the member 3 heats up. Then current through the cap 56, element 60, blocks 59, member 3 and the contacts will heat the member to open the circuit; and as the circuit remains open the member 3 cools and brings the contacts together again. Or the member 3 with contacts 4 and 5 may be in parallel with the blocks 59, and the contacts close on heating and open on cooling. Then current through the carbon blocks will cause the member 3 to close the circuit and short-circuit the blocks 59; so that the member 3 will cool off and enable the contacts 4 and 5 to separate.

Figure 27:
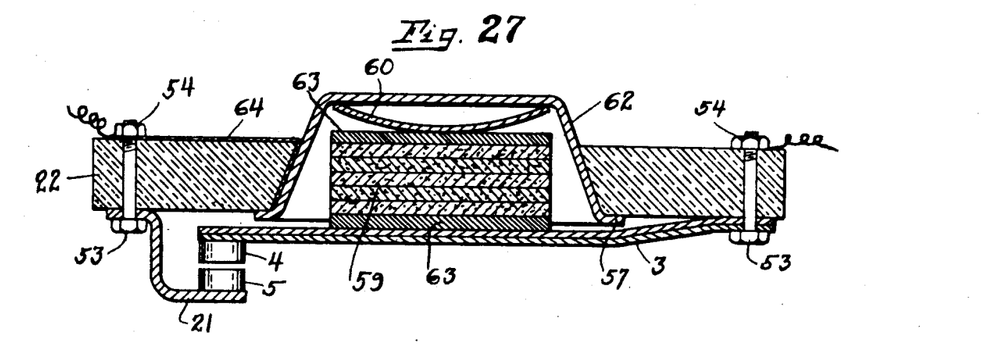

In Figure 27, the cap 62 is a flaring or conical cap, pressed into the opening of the disk 22, and the pile of carbon blocks has metal washers 63 at both ends. The member 3 is held by a bolt 53 and nut 54, and a similar nut and bolt holds the arm 21 for the fixed contact 5. This bolt is joined by a conductor strip to the metal cap 62; and the blocks 59 are thus in parallel with the contacts 4 and 5. On current flowing through the blocks 59, the member 3 is heated and makes the contacts 4 and 5 touch each other to short-circuit the blocks 59. Then the member 3 cools and the circuit opens; and so on successively.

Figure 28:
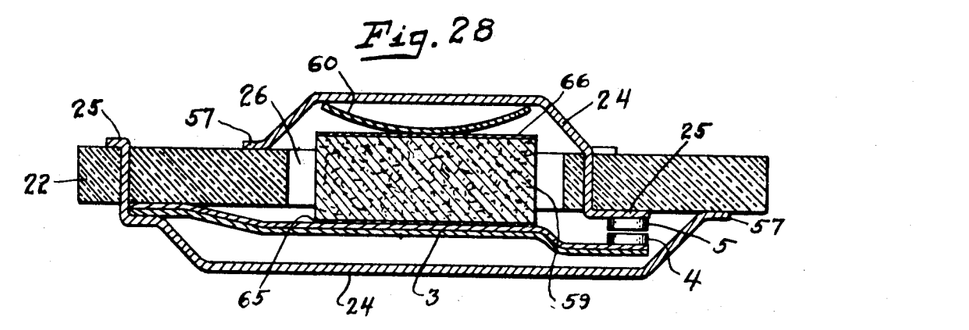

Figure 28 shows a disk 22 with an opening 26 and two metal caps 24 providing terminals for the device to cover the opening. These caps have projections 25 on their rims 57 to pass through openings in the disk and be bent over at their extremities to hold the caps on. Under the rim of one cap is held the end of the member 3; and the fixed contact 5 is attached to one of the projections of the other cap, as in Figure 11. Between the member 3 and the cap 24 on the opposite face of the disk 22 is a carbon block 59 with metal linings 65 and 66 on its opposite faces, and this block is engaged by a resilient element 60 under the cap 24 carrying fixed contact 5. This type will also fit into a standard lamp socket, and the circuit will be through the two caps. When the contacts 4 and 5 are apart, the current will take the path offered by the block 59 to heat the member 3 and bring the contacts 4 and 5 together. Then the block 59 will be short-circuited to enable the member 3 to cool and open the circuit.

Figure 29:
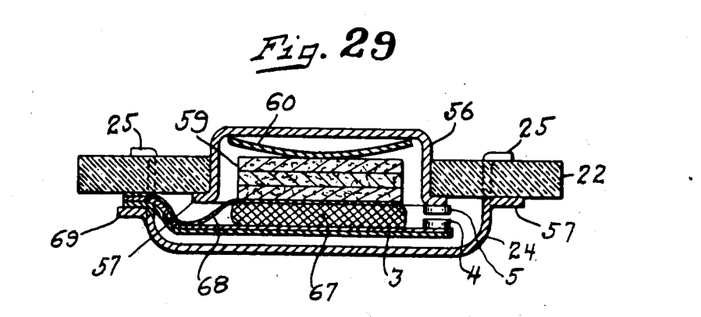
Figure 30:
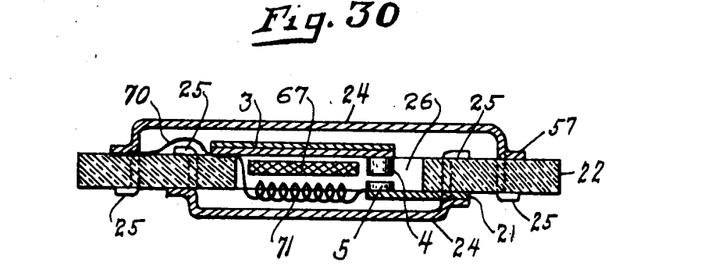

Figures 29 and 30 show constructions for working with a longer interval between flashes. The device in Figure 29 is very similar to that in Figure 28, except that the one cap 56 is cylindrical and has no projections 25, but engages the face of the disk 22 bearing the other cap with a rim 57, and on this rim is the fixed contact 5. The other cap is similar to the lower cap 24 in Figure 28, but is rounded at the corners. Between the cap 24 and the carbon blocks is the member 3 with one end held fast under the rim 57 of this cap, and between the carbon blocks and the member 3 is a heat-insulating block 67. A conductor strip 68 on this block connects the carbon blocks 59 with the member 3. The operation of this modification is the same as in Figure 28, except that the circuit is closed and opened more slowly, and a lamp therein will flash less rapidly.

Figure 30 shows a device similar to that of Figure 29, so far as the arrangement of the member 3 and fixed contact 5 are concerned. The member 3 and contact 5 are bridged by a heater coil 71, with a heat insulating body 67 between the coil and member 3. The member 3 is connected to one cap 24 and the contact 5 to the other. Each cap is held to the disk by projections 25 at the rim 57 passing through recesses in the disk 22, and bent over to secure them against withdrawal. A conductor 70 connects the member 3 to the upper cap 24, and the member 3 is fastened in any suitable way.

Figure 31:
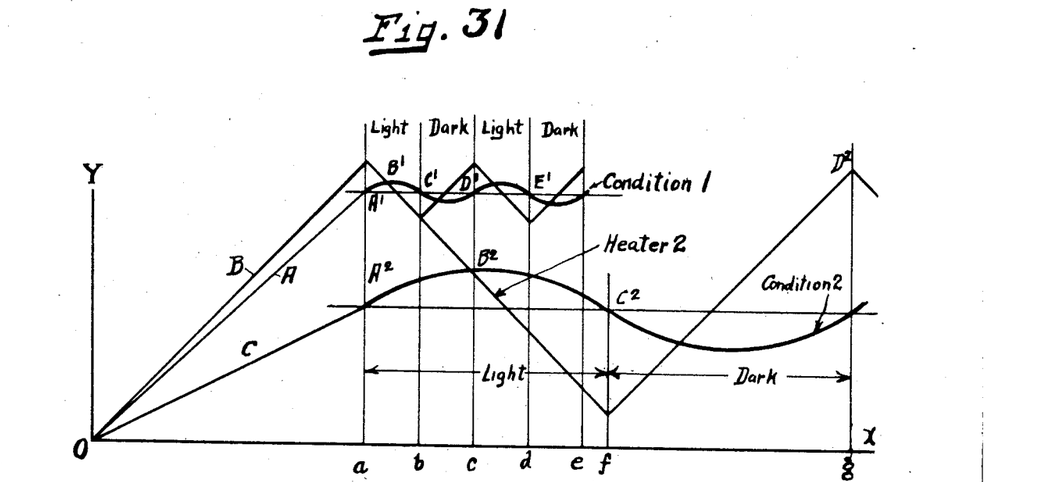
Figure 31 is a chart to explain the operation of the various devices shown herein.

Figure 31 is a chart showing the action of the flasher device. OX and OY are two coordinate axes, the former indicating temperature, and the latter, time. With the device of Figure 1, for example, the curve A indicates the rise in temperature of the member 3; and the curve B, the rise in temperature of the coil 7. When a period has elapsed corresponding to the distance from the point O to the foot of the ordinate $a$, the temperature of the member 3 indicated by point A1 is high enough to close the circuit, although less than the temperature of the coil 7. For this reason the line A is below the line B. A lamp in the circuit will now light up, the curve B drops as the coil 7 cools, but the curve A continues to rise as the member 3 heats up a little more, and does not begin to drop till it intersects the curve B at the point B1. The two then drop in unison to the point C1 on ordinate $b$, when the light goes out. Curve B then rises again, and when it reaches the ordinate c at point D1, the lamp again lights. In the meantime the curve A is also rising. Curve B now drops once more but curve A continues to rise beyond the ordinate c till it again intersects curve B, and the two drop together to the point E1 on the ordinate d; whereupon the lamp again goes out, and so on. This operation is indicated as "condition 1." When a heat-insulating block is present as in Figures 29 and 30, the strip 3 heats as shown by curve C. The lamp lights at point A2 on ordinate a', then the curve B descends while the curve C continues to ascend till it intersects the curve B at point B2 between the ordinates b and c. Then the curve C descends, but not so fast as the curve B. When the point C2 on the ordinate f is reached, the lamp goes out. Then the curve B rises again, and between the ordinates f and g where the curves B and C again intersect, the upward slope of the curve A is restored and a little further at point D2 on ordinate g the lamp again illuminates. This is referred to as "condition 2". As seen from this chart, due to difference in temperature between the heater and the strip caused by heat insulation 67 the operation of the device in condition 2 is much slower and the period of darkness and illumination are considerably longer than in condition 1.

Figure 32:
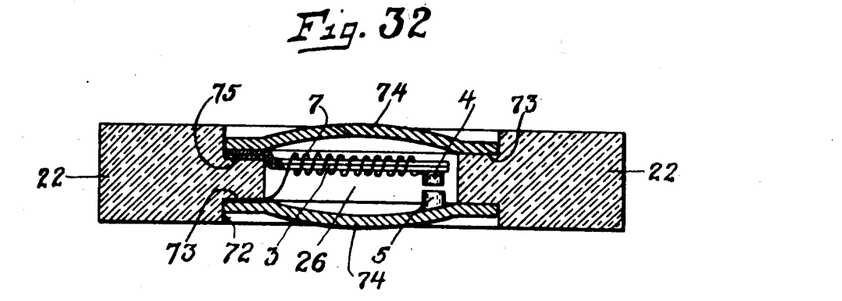
Figure 32 is a section and Figure 33 a top view of another modification.
Figure 33:
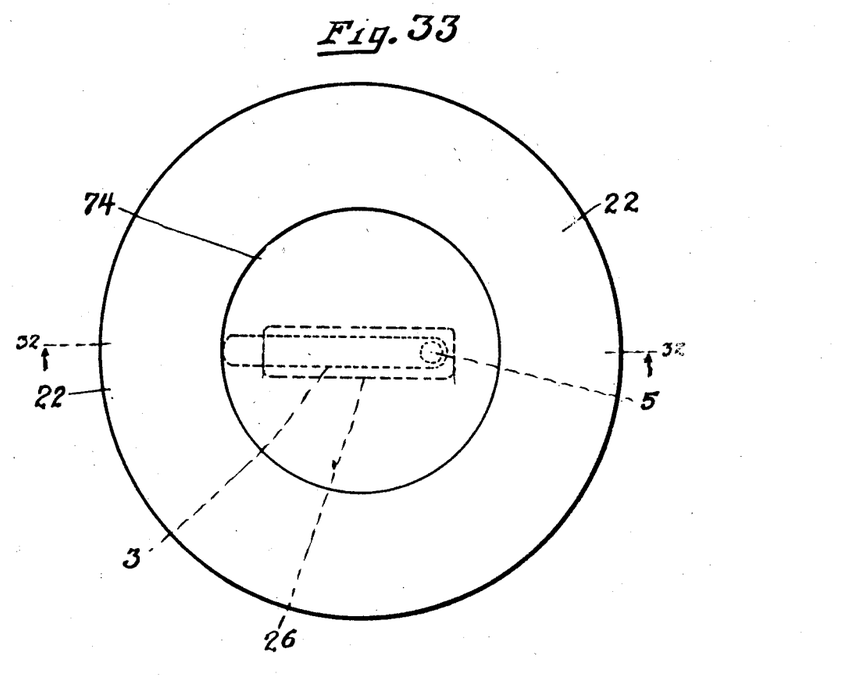

Figures 32 and 33 show an insulating support 22 with an elongated opening 26. In both faces of the disk are circular recesses 72, the bottoms of which 73 form shoulders surrounding the opening 26. Into these recesses are tightly fitted caps 74 resting on the shoulders 73. The caps are disks of metal convex outside and concave inside which are forced almost flat on assembly. On one shoulder 73 in a recess 75 is the end of the strip 3 secured fast under the adjacent cap 74. The other cap carries a fixed contact 5.

The heating element 7 is connected between the two caps 74, one end being pressed under the rim of the lower cap 74 and the other end connected to the contact 4 on the strip 3.

Figure 14:
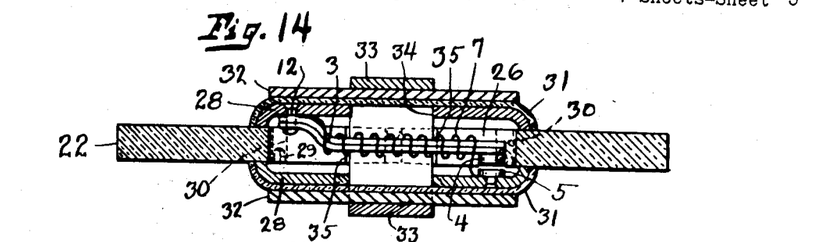
Figure 14 and Figure 15 are transverse sections, taken at right angles, of a further modification of a lamp-socket controlling device.
Figures 15, 16, 17:
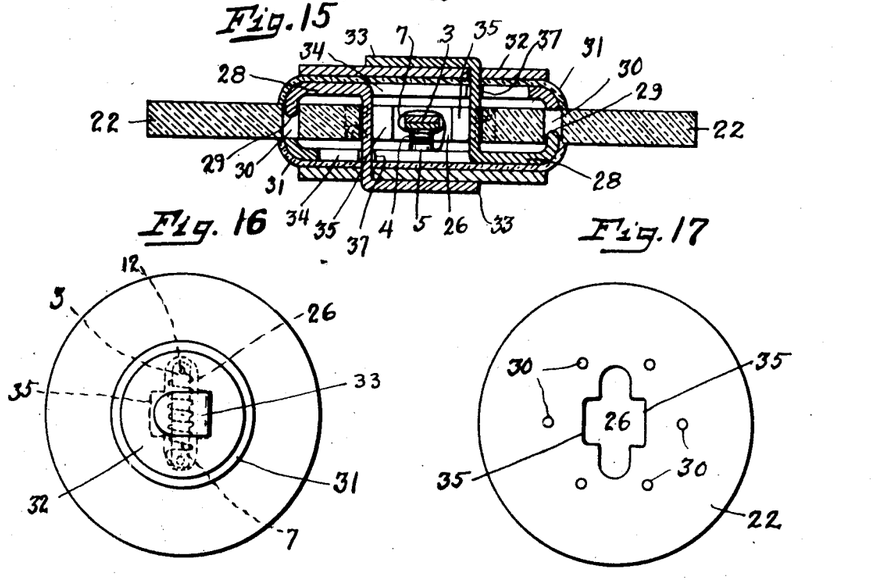
Figure 16 is a top view thereof.
Figure 17 is a plan view of the support or insulating body thereof.

This device is very easy and inexpensive to manufacture and operates in the same way, for example, as the device shown in Figure 14.

Having described my invention, what I believe to be new and desire to secure and protect by Letters Patent of the United States is, 1. A flasher device for an electrical circuit comprising an integral insulator body having an opening, a fixed contact projecting into the opening, a bimetallic member on the insulator body bearing a co-operating contact, a heater coil for said member, conducting terminal caps on the opposite faces of said opening enclosing said member, said contact and said coil, and electric connections between said caps, said member, said contact and said coil to cause periodic interruptions of said circuit.

2. A flasher device for an electrical circuit comprising an insulating support having an opening, shoulders being formed in each face surrounding the opening, a thermally responsive member carrying a movable contact secured against one shoulder, metallic caps fitting tightly into said openings and engaging the shoulders, one of said caps holding fast said member and the other carrying a fixed contact to co-operate with the movable contact, and a heater coil associated with the member and in circuit with said caps.

3. A flasher device to be inserted into an electric light socket consisting of an insulating base having depressions and an opening, a thermally operated circuit breaker, means for rigidly holding said thermally operated circuit breaker in said opening and depressions and metallic terminals on either side of the said base.

4. A flasher device for an electrical circuit comprising a disc-shaped insulating support having an opening, shoulders formed in each face surrounding said opening, a thermally responsive member carrying a movable contact secured to one of said shoulders, metallic terminal caps engaging said shoulders, one of said caps holding fast said member and the other carrying a fixed contact to operate with said movable contact and a heater coil associated with said member and in circuit with said caps.

5. A flasher device for an electrical circuit comprising a disc-shaped insulating support to fit into an electric light socket having an opening, shoulders formed in each face surrounding said opening, a thermally responsive member carrying a movable contact secured to one of said shoulders, metallic terminal caps engaging said shoulders, one of said caps holding fast said member and the other carrying a fixed contact to operate with said movable contact and a heater coil associated with said member and in circuit with said caps.

6. A flasher device for an electrical circuit comprising an integral disc-shaped insulating body adapted to fit into a light socket and having an opening, a fixed contact projecting into said opening, a bimetallic member supported on the insulating body and bearing a cooperating contact, a heater coil for said member, conducting terminal caps on the opposite faces of said opening enclosing said member, said contact, said coil, said caps and said member being electrically connected to cause periodic interruptions of said circuit.

7. In a flasher for an electrical circuit, an insulator body having an opening, a thermally responsive element and a cooperating member in said opening and a disc-shaped contact making cover on both sides of said opening for supporting said element and said cooperating member.

8. In a flasher for an electrical circuit, an insulator body with an opening, a thermally responsive element and a cooperating member in said opening, a contact making cover over said opening for supporting said element and an electrical connection joined to said thermally responsive element and said cover.

9. A flasher device for an electrical circuit comprising an integral disc-shaped insulating body having an opening and adapted to fit into a light socket; a fixed contact within said opening; a bimetallic member within said opening supporting a contact cooperating with said first mentioned contact; a heater coil for said bimetallic member; conducting terminal caps on the opposite faces of said opening and closing said member, said contacts, and said coil, one of said caps being electrically connected to said coil and the other of said caps being electrically connected to said first mentioned contact.

10. A flasher device for an electrical circuit comprising an integral disc-shaped insulating body having an opening and adapted to fit into a light socket; a fixed contact within said opening; a bimetallic member within said opening supporting a contact cooperating with said first mentioned contact; a heater coil for said bimetallic member electrically connected to said cooperating contact; conducting terminal caps on the opposite faces of said opening and closing said member, said contacts, and said coil, one of said caps being electrically connected to said coil and the other of said caps being electrically connected to said first mentioned contact.

11. A flasher device for an electrical circuit comprising an integral disc-shaped insulating body having an opening and adapted to fit into a light socket; a fixed contact within said opening; a bimetallic member within said opening supporting a contact cooperating with said first mentioned contact; a heater coil for said bimetallic member electrically connected to said cooperating contact; conducting terminal caps on the opposite faces of said opening and closing said member, said contacts, and said coil, one of said caps being electrically connected to said coil and the other of said caps being electrically connected to said first mentioned contact, said caps being arranged to permit movements thereof due to pressure thereon without effecting said bimetallic member.

12. A flasher device for an electrical circuit comprising an integral disc-shaped insulating body having an opening and adapted to fit into a light socket; a fixed contact within said opening; a metallic member within said opening supporting a contact cooperating with said first mentioned contact; a heater coil for said bimetallic member electrically connected to said cooperating contact; conducting terminal cup-shaped caps on the opposite faces of said opening and closing said member, said contacts, and said coil, one of said caps being electrically connected to said coil and the other of said caps being electrically connected to said first mentioned contact.

In testimony whereof I affix my signature.

WILLIAM DUBILIER.